April 7, 1953   S. SWEET   2,634,400
MOTOR VEHICLE KEY SIGNALING DEVICE
Filed Jan. 31, 1951   2 SHEETS—SHEET 1
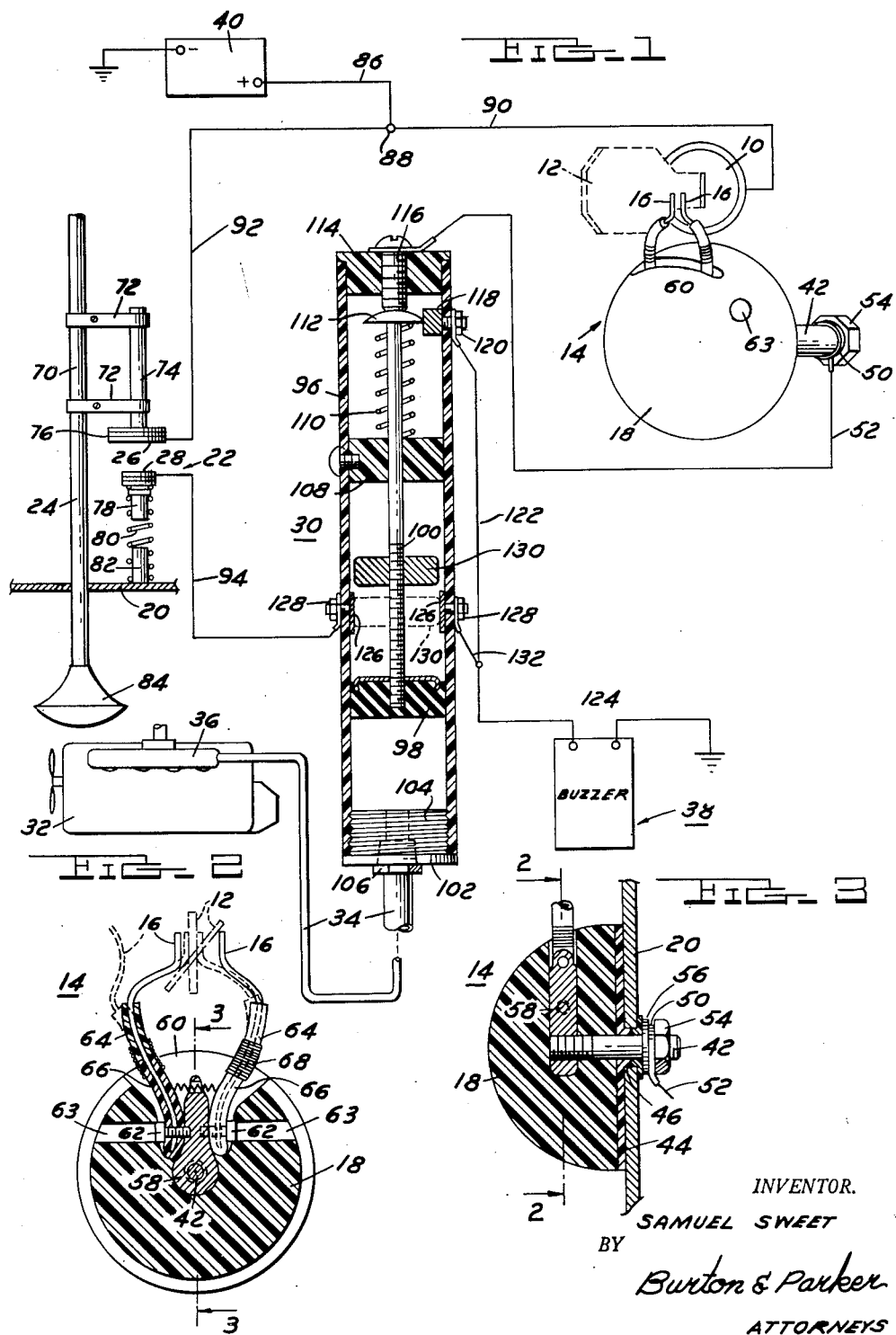
INVENTOR.
SAMUEL SWEET
BY
Burton & Parker
ATTORNEYS April 7, 1953 S. SWEET 2,634,400
MOTOR VEHICLE KEY SIGNALING DEVICE
Filed Jan. 31, 1951 2 SHEETS—SHEET 2
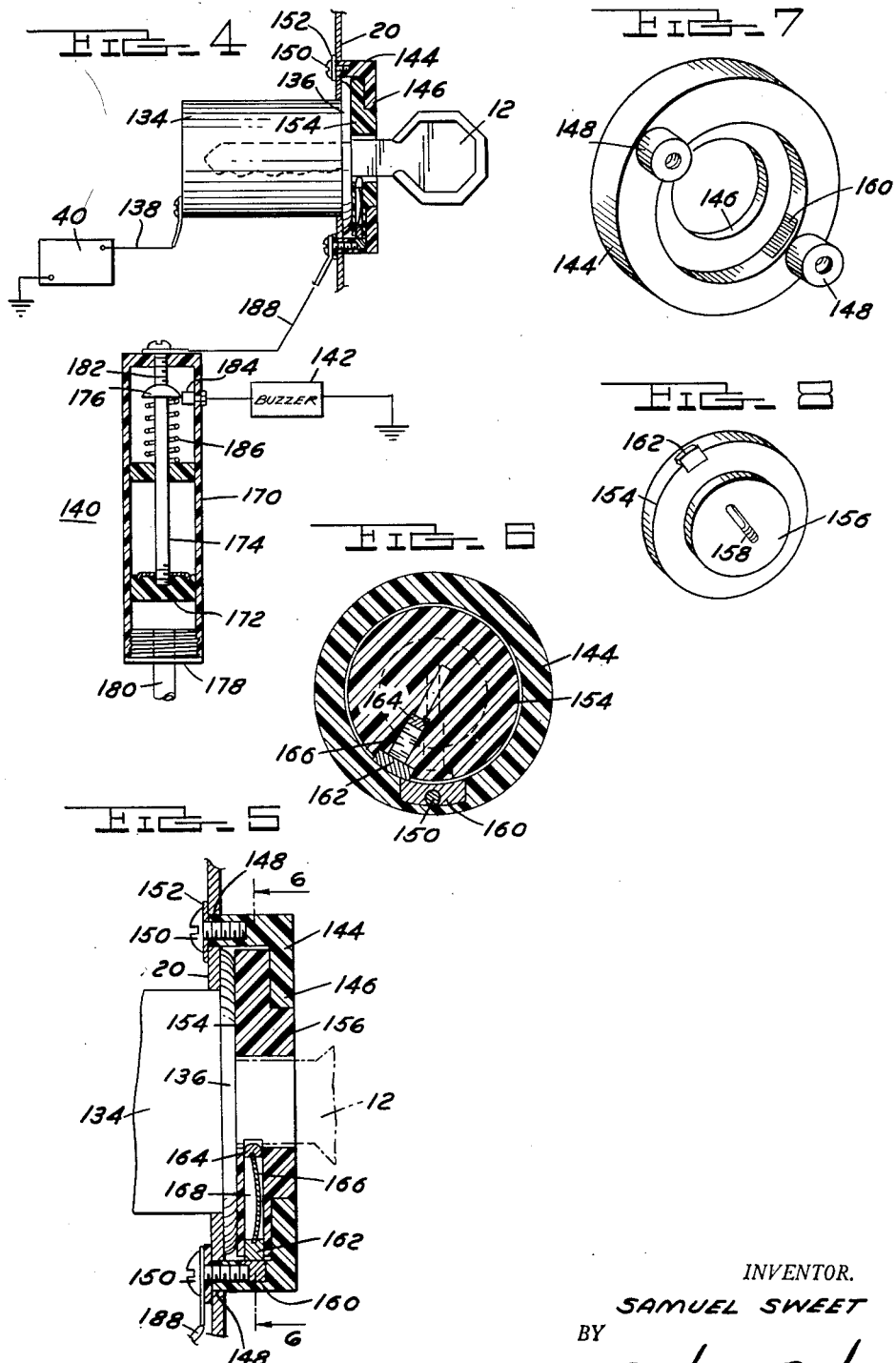
INVENTOR.
SAMUEL SWEET
BY
Burton & Parker
ATTORNEYS Patented Apr. 7, 1953

2,634,400

UNITED STATES PATENT OFFICE 2,634,400

MOTOR VEHICLE KEY SIGNALING DEVICE

Samuel Sweet, Detroit, Mich.

Application January 31, 1951, Serial No. 208,754

4 Claims. (Cl. 340—69)

This invention relates to warning devices for motor vehicles and particularly to an electric signalling system for informing the operator of the existence of certain undesirable conditions of the motor vehicle.

An important object of the invention is to provide a motor vehicle signalling device for indicating certain undesired conditions of the vehicle and particularly to notify the operator of certain conditions respecting the ignition key or the emergency brake. This invention is particularly adapted for warning the operator of a motor vehicle of the retention of the key in the ignition switch when the motor vehicle is not operating under its own power and the application of the emergency hand brake when the vehicle is operating under its own power. Another important object of the invention is to provide an improved electric signalling system containing control elements operatively associated with either the ignition switch or the emergency brake or both and including means in novel association therewith which is responsive to the operation of the engine of the motor vehicle for imposing a supervisory control over the circuit. A further important object of the invention is to provide a signalling or warning device of this character which is capable of being produced at low cost and quickly and economically installed in a motor vehicle with very little if any modification of the structure thereof.

In carrying out the invention, the device comprises an electric circuit including control elements associated with the ignition key and with the hand or emergency brake and further including a master switch mechanism controlled by the engine and capable of varying the operation of the circuit depending upon whether the engine is functioning or not. One control element of the circuit is mounted adjacent to the ignition switch of the motor vehicle, preferably on the instrument panel, and arranged to engage the ignition key inserted therein. Another control element of the circuit is associated with the hand brake and adapted to be moved to closed position when the hand brake is applied. Separate branch circuits are provided for the two control elements which lead to a single alarm or warning indicator. Common to the two branch circuits is a master switch control which is operatively connected with the engine of the motor vehicle and is responsive thereto to control the two branch circuits and the operation of the warning indicator. The master switch control is preferably operated by differential pressures created by the engine. It is preferred, from the point of economy and convenience of installation, to use a pressure responsive device which is connected into the air intake of the engine and is responsive to the differential air pressures developed by the engine.

A feature of the invention is the provision of an improved control device associated with the ignition switch and capable of being installed and operated without altering the construction of the switch. Another feature of the invention is the provision of means for enabling the operator at any time to adjust at least one of the control elements in order to render the particular branch circuit associated therewith inoperable.

Various other objects, advantages and meritorious features of the invention will become more fully apparent from the following specification, appended claims and accompanying drawings wherein:

Fig. 1 is a schematic view of the electric circuit showing control devices associated with the ignition key and the hand brake and a longitudinal sectional view through an engine responsive master switch, Fig. 2 is a vertical sectional view taken through the control device associated with the ignition switch showing in full and dotted outline certain positions of the parts thereof, Fig. 3 is a vertical sectional view taken along line 3—3 of Fig. 2, Fig. 4 is a schematic view showing a modified form of ignition switch control device and its association with an engine responsive master switch, Fig. 5 is an enlarged longitudinal sectional view through the ignition switch control device of Fig. 4, Fig. 6 is a sectional view through the ignition switch control device of Fig. 5 and taken along line 6—6 thereof, Fig. 7 is a perspective view of the stationary part of the ignition switch control device shown in Figs. 4 to 6, and Fig. 8 is a perspective view of the movable part of the ignition switch control device.

In the embodiment of the invention illustrated in Figs. 1, 2 and 3, the outer face of the ignition switch is shown at 10 and illustrated in dotted outline is an ignition key 12 having one end inserted into the ignition switch and the other or handle end projecting outwardly away therefrom. The ignition switch may be of the conventional type including a rotatable barrel having a slot for receiving the inserted end of the ignition switch. When the proper key is inserted into the ignition switch, the key together with the barrel may be rotated from an "off" position to an "on" position and return. In the "on" position, the engine of the motor vehicle may be started and operated, and in the "off" position, the ignition circuit will be cut off and also the operation of the engine.

Associated with the ignition switch and preferably electrically connected thereinto by engagement with the ignition key is a control element generally indicated at 14 in Figs. 1, 2 and 3. The control element is preferably attached to the outer or front side of the instrument panel immediately adjacent to the ignition switch such as being disposed therebelow as shown in Fig. 1. The switch element 14 includes two similarly formed contact members 16—16 which are arranged to contactually engage the outer end of the ignition key for closing a branch circuit hereinafter described. The switch element 14 includes a body 18 which as shown may be of a hemispherical shape and attached to the instrument panel 20 below the ignition switch. The body is preferably formed of insulated material such as a molded plastic composition.

A control element generally indicated at 22 in Fig. 1 is associated with the hand or emergency brake. Motor vehicle emergency hand brakes usually have a pull rod such as that indicated at 24 which may extend through the instrument panel 20 as shown or supported by any suitable means therebelow. The control element 22 comprises two contact members 26 and 28 which are arranged to engage one another and close a branch circuit hereinafter described when the hand brake is moved to brake applying position.

A master control element is generally indicated at 30 in Fig. 1 and includes make and break switches for opening and closing the two branch circuits. The master switch is operatively connected to the motor vehicle engine, shown in small scale at 32, and is responsive to the operation thereof to control the branch circuits. In the illustrated embodiment of the engine, the master control element is operated by differential air pressures created by the air intake of the engine. For this purpose, a conduit 34 is led from the master switch either directly to the intake manifold 36 of the engine or to a vacuum operated device associated therewith, such as the windshield wipers.

Associated in the circuit is a warning or alarm indicator generally shown at 38. This indicator may be a conventional electric buzzer adapted when energized to emit a sound. The indicator may be of any suitable design for this purpose and in lieu of emitting a sound may be constructed to flash a warning light on the instrument panel. The control circuit including the buzzer apparatus is electrically energized to any suitable source such as the motor vehicle battery indicated at 40.

The general arrangement of the parts of the embodiment of the invention illustrated in Figs. 1 to 3 has been set forth hereinabove. These include the two control elements 14 and 22 associated respectively with the ignition switch and the emergency brake of a motor vehicle, a master control element 30 operatively associated with the engine of the motor vehicle, and the warning indicator 38 to advise the operator of any undesired operational condition of the vehicle. The control element 14 for the ignition switch and its associated branch circuit is designed to indicate any accidental retention of the key in the ignition switch after the engine has ceased to operate and particularly to prevent the operator from leaving the vehicle with the key in the ignition switch. The control element 22 for the emergency brake is designed to indicate any accidental application of the hand brake during the operation of the vehicle and particularly to prevent the operator from driving the vehicle with the hand brake applied.

The body 18 of the ignition switch control element 14 is mounted on the instrument panel such as by means of a bolt 42 which serves part of the branch circuit with which the two contact members 16—16 are associated. For insulation purposes, an aperture or hole in the panel through which the bolt 42 extends is made larger than the diameter of the bolt in order to receive insulating material between the bolt and the edge of the hole in the panel. For this purpose, the inner flat side of the body 18 may abut or have secured thereto a sheet 44 of insulating material having a circular ridge 46 which extends part way through the hole in the panel 20. On the back side of the panel is an insulating element 48 in the form of a grommet which likewise projects part way into the bolt hole. The circular ridge 46 and the grommet 48 complement one another and function to centrally space the bolt from the edge of the hole, as is evident in Fig. 3. The bolt projects beyond the insulating grommet 48 and secured thereto is the terminal end 50 of an electric conducting wire 52. A nut 54 completes the assembly and as shown in Fig. 3 not only functions to hold the body 18 on to the front side of the panel but also to clamp the terminal end 50 to the wire 52 against a washer 56 to form an electrical connection with the bolt.

The opposite end of the fastening bolt 42 is threadedly received in one end of a member 58 of electric conductive material. The member 58 may assume the formation shown in Figs. 2 and 3 and as evident from these figures it is mounted within the body 18 as in insert. The opposite or upper end of the member 58 projects into a generally V-shaped slot 60 which opens in the direction of the key 12. The two contact members or fingers 16—16 extend into this slot and downwardly along the opposite side of the member 58 as shown in Fig. 2. Extending inwardly from opposite sides of the body 18 are two similarly formed axially aligned pins 62—62, the inner ends of each of which are reduced and threaded as shown to engage the member 58. The lower extremities of the fingers 16—16 are electrically connected to the inner ends of the pins, such as by extending contactually alongside of the reduced portions of the pins or being fitted into transverse bores formed therein. The two pins 62—62 are of electrical conductive material and serve as a relatively rigid support for electrically connecting the fingers to the member 58 and the bolt 42 to which it is joined.

The contact fingers 16—16 are preferably formed of resilient material such that they may be readily bent out of their normal position and returned to such position when pressure is relieved. The two fingers are preferably slightly spaced apart from one another and are so disposed with respect to the key slot of the ignition switch that when the key 12 is inserted thereinto it slides between the fingers while maintaining contact therewith. In Fig. 2, the vertical position of the key and the dotted positions of the fingers 16—16 immediately adjacent to the opposite sides thereof show the relation of these parts of one another when the key is first inserted into the ignition switch prior to the turning thereof to engine operating position When the key 12 is turned to engine operating position, such as in a clock-wise direction to the inclined position shown in Fig 2, the two fingers 16—16 are spread apart thereby to the full line position shown in Fig. 2 while continuing to maintain contact with the key. A similar relationship will occur if the key is turned in the opposite direction.

Although the control element 14 and its contacting fingers 16—16 are shown as being applied to an ignition key of the character that when inserted in the ignition switch it extends in a vertical plane and is turned to an inclined position to close the ignition circuit of the engine. It is understood that the control element may be suitably mounted to have its fingers engage an igntion key which operates in any other manner to turn on and off the ignition circuit Each finger 16 of the control element 14 is preferably insulatively sheathed for the major portion of its length. The sheathing of each finger is preferably divided into two separate sections 64 and 66 enclosing different portions of the finger and end abutting one another. Overlappingly encircling the abutting ends of the two sections of the sheath is a relatively tightly wound coiled wire 68. The coiled wire together with the two sections of the sheath will hold the finger in any manually adjusted position relative to the key and will enable the operator to shift either one or both of the fingers completely out of contact with the key if it is desired to temporarily discontinue the operation of the control element 14. One position to which the fingers may be adjusted to break contact with the key is shown in dotted outline by lifting finger 16 of Fig. 2. When it is desired to return either one or both fingers for engagement with the key, the operator can easily bend the sheathed portions of the finger inwardly toward the key for contact therewith.

The control element 22 for the emergency or the hand brake has been previously described as including two contact members 26 and 28 which are brought into engagement with one another to close a branch circuit when the hand brake is pulled to brake applying position. One contact member, such as 26, is mounted in any suitable manner on the control rod 70 of the hand brake, such as by means of a pair of clamping members 72—72 which secure a post 74 to the rod 70 for joint travel therewith. The contact member 26 is mounted on one extremity of the post 74 and is insulated therefrom by means of a sheet or disc of insulation indicated at 76. The other contact member 28 is similarly insulatively mounted on a short post 78 which is yieldingly projected toward the contact member 26 by means of a coiled spring 80. One end of the coiled spring encircles the post 78 and is stated thereon and the other end of the spring encircles a short post or stud 82 fixed to the panel 20 or other suitable support structure of the vehicle. As shown in Fig. 1, the end of the spring opposite to the contact member 28 is seated against the panel 20 and mounted in this manner yieldingly urges the contact member 28 inwardly from the panel and toward the contact member 26. It is evident that when the handle 84 of the hand brake is pulled outwardly relative to the panel 20 that it will bring the contact member 26 into engagement with the contact member 28.

The motor vehicle battery 40 or other source of electrical energy has a lead wire extending therefrom which is divided at 88 into two branch circuits 90 and 92. One branch circuit, such as 90, extends to the inner end of the ignition switch and is connected thereto. This branch circuit may be usual lead wire from the battery for conducting electrical current to the ignition switch. The other branch circuit 92 extends to one of the switch members of the control element 22, such as the contact member 26, as indicated in Fig. 1. Leading from the other contact member 28 of the control element 22 is a lead wire 94 which forms the balance of the branch circuit 92 and is joined thereto when the two contact members 26 and 28 engage one another.

The master control element is operated from the engine 32 as hereinbefore mentioned and preferably is constructed to function in response to pressure changes in the air intake of the manifold. So constructed, the master control element 30 comprises in general a cylinder 96 in which reciprocates a piston 98 having a control rod 100. The cylinder 96 may be in the form of a tube of transparent plastic material rendering the inner parts thereof visible to the operator. One end of the cylinder 96, such as the lower end thereof as illustrated in Fig. 1, may be provided with a closure plug 102 having an externally threaded part 104 threadedly engaging the inner surface of the tube to form an airtight joint therewith. Forming part of the plug 102 is a fitting 106 to which one end of the conduit 34 is connected. As previously described, the conduit 34 is connected to a pressure varying part of the engine, such as the intake manifold or a vacuum operated wind-shield wiper.

Extending crosswise of the cylinder 96 is a support 108 which may be formed of molded plastic material. This support is axially bored to form a guide for the rod 100 of the piston and also serves as a seat for a coiled spring 110. The end of the rod 100 opposite to the piston 98 is provided with a head 112 against which coil spring 110 seats. The relationship of the spring to the piston is such that it yieldingly urges the piston away from the end of the cylinder to which the conduit 34 is connected. The spring 110 operates in a direction reverse to the influence of the vacuum created by the operation of the engine and is of such a tension that when the engine is operated the vacuum created thereby will overcome the tension of the engine and draw the piston downwardly toward the plug 102. The end of the cylinder 96 opposite to the plug 102 is closed and tightly sealed by a plug 114 which is of insulated material and may be formed of molded plastic.

Associated with the pressure responsive device 30 are make-and-break switches for opening and closing a control circuit to the indicator 38. As shown in Fig. 1, the plug 114 is provided with an electric terminal 116 in the form of a bolt which axially projects therethrough and into the interior of the cylinder 96. This terminal is adapted to be engaged by switch 112 as is evident in Fig. 1. Mounted in the side wall of the cylinder 96 and closely adjacent to the terminal 116 is a contact member 118 of electrically conductive material. This contact member is mounted by means of a nut and bolt assembly indicated at 120 so as to be engaged by the switch 112 of the piston when the latter is abutting the terminal 116. Leading from the bolt connection 120 is a wire 122 which extends to one of the terminals 124 of the indicator 38. It is evident from Fig. 1 that when the engine is not operating, the spring 110 will shift the piston toward the terminal 116 bringing the head 112 into contact simultaneously with the terminal and the contact member 118 and electrically connecting the wire 52 leading from the ignition switch control element 14 with the wire 122 leading to the alarm indicator 38. However, when the engine is operated, the vacuum created thereby will draw the piston toward the conduit 34 and break the contact of the switch 112 with the terminal 116 thus interrupting the circuit to the indicator 38. It is thus apparent that if the ignition key 12 should be turned to off position, at which time the engine ceases to operate, the piston will move under the influence of the spring 110 into engagement with the terminal 116 and close the circuit between the battery 40 and the indicator 38 causing the latter to emit a sound or otherwise indicate to the operator that the key is in the ignition switch without the engine being operated. The operation of the buzzer 38 or other form of indicator will advise the operator that he should remove the ignition key before leaving the vehicle unattended. If it is the desire of the operator to retain the key in the ignition switch in the off position, he may spread the fingers 16—16 apart sufficiently to break their contact with the key and thus interrupt the circuit to the buzzer.

Also carried by the master control element is a make-and-break switch connecting the emergency brake control element 22 with the alarm indicator 38. This make-and-break switch may consist of two similarly formed electrical contact plates 126—126 disposed, as shown, in the interior of the cylinder 96 and diametrically opposed to one another. Suitable nut and bolt assemblies 128 may be provided for mounting these contact plates in the interior of the cylinder. Carried by the rod or plunger 100 of the piston is a cross member 130 of electrically conductive material which when disposed between the two plates 126—126 will simultaneously engage the same and serve to electrically connect the two plates together. The contact member 130 carried by the piston operates in reverse to the head 112 thereof and when the engine is not operating it assumes a position out of contact with the plates as indicated in full line in Fig. 1, but when the engine is in operation it will be drawn between the two plates and into engagement therewith as shown in dotted outline in Fig. 1. The lead wire 94 from the contact member 28 of the control element 22 is connected to one of the plates 126—126 as shown in Fig. 1. The other contact plate 126 is connected by means of a wire 132 with the lead wire 122 extending to the indicator 38.

It is evident from the relationship of the parts in Fig. 1 that if the hand brake should be applied while the engine is in operation a complete circuit will be established between the battery 40 through the contact members 26 and 28 and the plates 126—126 to the alarm indicator 38. In these circumstances, the buzzer or other form of indicator will inform the operator that the hand brake is in applied position while the engine is in operation. This will prevent the operator from driving the vehicle with the hand brake applied.

Figs. 4 to 8 inclusive illustrate a modification of the invention and particularly that part relating to the ignition switch control element. In lieu of the fingers 16—16 which project toward the ignition key for engagement therewith, the modification provides an assembly of parts which is mounted directly over the outer face of the ignition switch and is secured to the panel in overlying relation thereto. As shown in Fig. 4, a conventional ignition switch body is indicated at 134 projecting rearwardly from the instrument panel 20. The body 134 is provided with a front plate 136 which has a larger diameter than the body 134 and abuts the front side of the panel 20 in the manner indicated in Fig. 4. A battery, such as the motor vehicle battery 40, is connected by lead wire 138 to the ignition switch. Also associated with the ignition switch control is an engine operated control device generally indicated at 140 similar to the control element 30 previously described and an alarm indicator in the form of a buzzer 142.

Overlying the front plate 136 of the ignition switch is an assembly of parts illustrated in Figs. 7 and 8. One of these parts consists of a ring 144 of insulated material such as molded plastic having an inwardly projecting circularly formed flange 146. The inner diameter of the ring 144 is such that it may encircle the front plate 136 of the ignition switch and have the end thereof opposite to the flange abut the outer side of the panel 20. The circular flange 146 is of less diameter than the front plate 136 and partially overlies the same in spaced relation thereto as is evident in Figs. 4 and 5. The ring 144 is secured to the front side of the panel 20 either by adhesion or by the provision of short similarly formed studs 148—148 which may be integrally molded together with the ring and project from the inner end thereof in the manner shown in Fig. 7. For the reception of the studs 148—148 the panel 20 is provided with holes disposed on the opposite sides of the front plate 136. Suitable screws 150 together with washers 152 are threaded in bores in the studs 148 and mount the ring on the front side of the panel in a manner which is clearly shown in Fig. 5.

The other part of the assembly overlying the front plate 136 of the ignition switch consists of a rotatable member 154 of insulating material such as molded plastic. As shown in Fig. 8, this member is of a circular formation having such a diameter that it may be received inside of the ring 144 and between the flange 146 thereof and the front plate 136 of the ignition switch. The rotatable part 154 is provided with a centrally located projecting boss 156 of circular formation which when assembled inside of the ring 144 projects through the reduced opening of the flange 146 and extends substantially flush with the outer face thereof. Formed in the boss and also extending through the main body portion of the part 154 is a key slot 158 through which the ignition key 12 is inserted and removed.

Carried by the stationary ring 144 of the assembly is an electrical contact member 160 which, as shown in Figs. 6 and 7, is mounted so that one side thereof opens through the inner wall of the ring and conforms to the curvature of the inner peripheral surface thereof. The contact member 160 is preferably secured in the ring 144 by one of the screws 150, as shown in Figs. 5 and 6.

Carried by the movable part or circular disc 154 of the assembly is an electrical contact member 162 which, as shown in Figs. 6 and 8, has one face thereof which opens through the outer peripheral surface of the disc for engagement with the contact member 160. The engaging face of the contact member 162 is arcuately curved to conform with the curvature of the contact member 160 so that when the inner movable part 154 is rotated the contact member 162 will slide or wipe across the exposed face of the contact member 160.

The contact member 162 of the movable part 154 is electrically connected with a key engaging element 164 disposed so as to expose one side thereof in the key slot 158. The two contact members 162 and 164 of the rotatable part are preferably electrically connected together by a flat strip or blade of electrically conductive material 166 which extends between the two contact members and has its opposite ends in engagement therewith. In order to prevent wear of the contact members from affecting the electrical connection therebetween, it is desired to place the blade 166 under tension, such as by bowing the same, as shown in Fig. 5, and by providing a radial passage 168 in the part 154 of a size to accommodate any flexture of the blade. In such a construction, it is desired to have the opposite ends of the blade 166 secured or fixed to the contact members 162 and 164 to form a unitary assembly of these elements. It is evident that the blade will yieldingly urge either or both of the contact members 162 and 164 outwardly from the opposite ends of the passage 168.

The control element 140 previously mentioned is constructed similar to the master control element 30 hereinabove described and includes a cylinder 170, a piston 172, a piston rod 174, and a head 176 on the end of the rod 174 opposite to the piston. The piston end of the cylinder 170 is provided with a closure plug 178 to which a conduit 180 leading to a vacuum operated part of the engine is connected. The opposite end of the cylinder 170 is closed and is provided with a terminal in the form of a bolt 182 which projects through the end of the cylinder and is adapted to be engaged by the head 176 in a manner previously described in connection with Fig. 1. Projecting through one side wall portion of the cylinder 170 is an electrical contact member 184 which is also adapted to be engaged by the head 176 when the latter is in engagement with the terminal 182. A spring 186 similar to spring 110 yieldingly urges the piston assembly toward the terminal 182 to bring the head 176 into simultaneous contact with the terminal and the contact member 184.

The contact member 166 of the stationary part or ring 144 is electrically connected with the terminal 182 by means of a lead wire 188. The result is that when the key 12 is inserted into the ignition switch it closes a circuit from the battery 40 through the key to the contact member 164 and thence through the blade 166, contact members 162 and 160 and through the control element 140 to the alarm indicator. Such circuit will be closed when the engine is not operating and the key is left in the ignition switch. During the operation of the engine, the vacuum created thereby will overcome the tension of the spring 186 pulling the piston toward the plug 176 and breaking the circuit by disengaging the head 176 from the terminal 182. Removal of the key 12 will, of course, also break the circuit from the battery to the buzzer.

In addition to serving as a warning to the operator that he is leaving his key in the ignition switch when the engine is not operating, the device may be also used as an alarm to the operator in the event the engine ceases operating when he desires it to continue operating for relatively long periods of time. Operators, such as those using long distance freight hauling vehicles, quite frequently park the vehicle on the side of the road and in cold weather operate the engine to keep themselves warm as they sleep. In such circumstances, the alarm device will commence operating in the event the engine should stall during such use and advise the operator that the engine has ceased to operate.

What I claim is:

1. In a motor vehicle having an engine, a key controlled ignition circuit, and a hand brake; a signalling circuit including an alarm device operatively associated with the ignition circuit and with the hand brake and operable upon insertion of the key in the ignition switch to close the circuit to the alarm device and upon the application of the hand brake while the engine is operating to close the circuit to the alarm device; a master switch in said signalling circuit for governing the operation of the signalling circuit; and means responsive to differential pressures created by operation of the engine for actuating said master switch.

2. In a motor vehicle having an engine, an ignition circuit including a key-operated ignition switch, and a hand brake; an electrical alarm device; a signalling circuit connected to the alarm device and to the ignition switch and operable when the key is in the ignition switch to cause the alarm device to function; a separate signalling circuit connected to the alarm device and to the hand brake and operable when the hand brake is applied to cause the alarm device to function; and a master switch common to said signalling circuits and movable to two positions; means associated with said master switch and operable when the same is in one of said positions to close the first signalling circuit when the key is in the ignition switch; means associated with the master switch and operable when the same is in its second position to close said second signalling circuit when the hand brake is applied; and means operatively connected to the engine and responsive to the operation or non-operation thereof for causing the master switch to move from one to the other of said positions.

3. In a motor vehicle having an engine, an ignition circuit including a key-operated ignition switch, and a hand brake; an electrical alarm device; a signalling circuit connected to the alarm device and to the ignition switch and operable when the key is in the ignition switch to cause the alarm device to function; a separate signalling circuit connected to the alarm device and to the hand brake and operable when the hand brake is applied to cause the alarm device to function; a master switch common to said signalling circuits and movable to two positions; means associated with said master switch and operable when the same is in one of said positions to close the first signalling circuit when the key is in the ignition switch; means associated with the master switch and operable when the same is in its second position to close said second signalling circuit when the hand brake is applied; and means responsive to differential pressures created by the operation or the non-operation of the engine and adapted to cause the master switch to move to the position to close the hand brake signalling circuit when the engine is operating and adapted to cause the master switch to move to the other position when the engine ceases to operate to close the ignition switch signalling circuit.

4. In a motor vehicle having an engine to drive the same, a key operated ignition switch for controlling the ignition circuit of the motor vehicle engine, a hand operated brake for retarding movement of the motor vehicle, a signalling circuit including an alarm device electrically associated with the ignition switch and with the hand brake and operable when the key is in the ignition switch to cause the alarm device to function and likewise operable when the hand brake is applied to cause the alarm device to function, means independent of the ignition switch and the hand brake for rendering the alarm device either operable or non-operable, and means operatively associated with the engine of the motor vehicle and responsive thereto to render the alarm device operable when the hand brake is applied while the engine is operating and to render the alarm device operable when the key for the ignition switch is retained therein after the engine ceases to operate.

SAMUEL SWEET.

REFERENCES CITED

The following references are of record in the file of this patent:

UNITED STATES PATENTS

| Number | Name | Date |
|---|---|---|
| 1,737,774 | Sherwood | Dec. 3, 1929 |
| 1,774,801 | Macke et al. | Sept. 2, 1930 |
| 2,253,425 | Garland | Aug. 19, 1941 |

FOREIGN PATENTS

| Number | Country | Date |
|---|---|---|
| 320,825 | Great Britain | Oct. 24, 1929 |